United States Patent [19]

Fiala

[11] 4,223,553

[45] Sep. 23, 1980

[54] ENGINE EFFICIENCY METER

[75] Inventor: Ernst Fiala, Wolfsburg, Fed. Rep. of Germany

[73] Assignee: Volkswagenwerk Aktiengesellschaft, Fed. Rep. of Germany

[21] Appl. No.: 18,716

[22] Filed: Mar. 8, 1979

[30] Foreign Application Priority Data

Mar. 18, 1978 [DE] Fed. Rep. of Germany ....... 2812025

[51] Int. Cl.³ .......................... G01L 3/26; G01M 15/00
[52] U.S. Cl. ........................................ 73/115; 116/56; 116/304
[58] Field of Search ................ 116/62.3, 57, 302, 300, 116/56; 73/112, 114, 115

[56] References Cited

U.S. PATENT DOCUMENTS

| 2,006,873 | 7/1935 | Purton | 116/302 |
| 2,983,248 | 5/1961 | Steinke | 116/302 X |
| 3,347,092 | 10/1967 | Stutson | 73/114 |
| 3,374,666 | 3/1968 | Shattuck | 73/115 |
| 3,375,711 | 4/1968 | Ives et al. | 73/115 X |
| 3,930,408 | 1/1976 | Kadota | 73/114 |
| 4,062,230 | 12/1977 | Perr et al. | 73/114 |

FOREIGN PATENT DOCUMENTS 7242452 11/1972 Fed. Rep. of Germany ............. 73/112

Primary Examiner—Daniel M. Yasich
Attorney, Agent, or Firm—Brumbaugh, Graves, Donohue & Raymond

[57] ABSTRACT

A meter for displaying the operating efficiency of a motor vehicle, which includes a pointer movable across an instrument face, is provided with an opaque screen covering the face and having a transparent window exposing a portion of the face corresponding to operating efficiencies of the vehicle while operating at a constant vehicle speed.

1 Claim, 1 Drawing Figure

U.S. Patent  Sep. 23, 1980  4,223,553
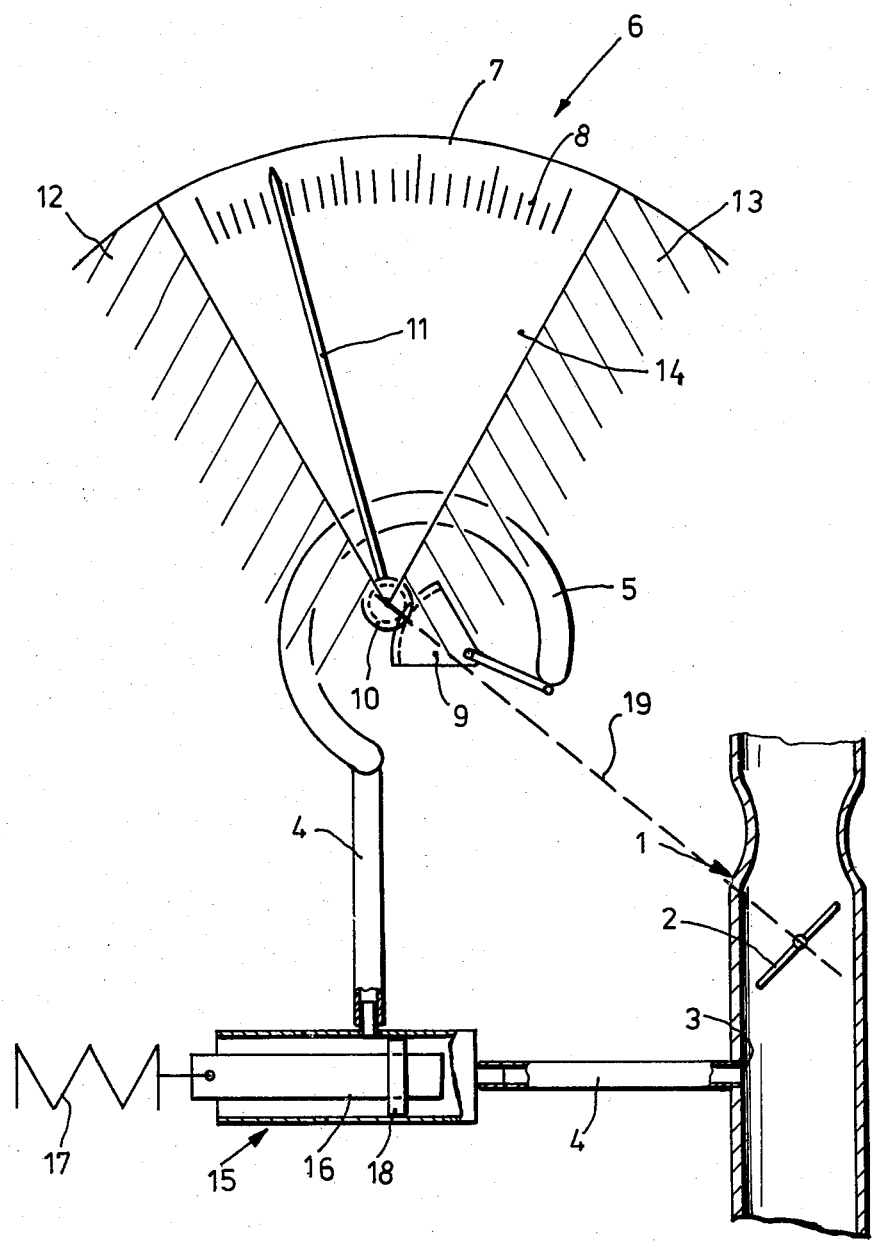

ENGINE EFFICIENCY METER

BACKGROUND OF THE INVENTION

This invention relates to meters for displaying the operating efficiency of a motor vehicle and in particular to such meters which include a pointer which is movable across an instrument face. A meter of this type is shown in German Utility Model No. 72 42 452 of Nov. 17, 1972.

Engine operating efficiency for an internal combustion engine motor vehicle is generally a function of engine speed. This function includes a region of highest efficiency which occurs at certain engine speeds corresponding to the vehicle cruising speed. The efficiency of the engine becomes lower at both higher and lower engine and vehicle speeds. In the region of highest efficiency, the relationship between the negative pressure in the intake manifold in the engine, commonly used to obtain an engine efficiency reading, and the engine speed is reasonably linear. Disregarding times when the vehicle is stationary, accelerating or decelerating, the operator should, in the interest of minimum fuel consumption and hence also in the view toward environmental conservation, operate the vehicle within the highest efficiency range of the speed curve.

During certain modes of engine operation, efficient operation of the engine is not entirely possible and the engine must operate in other regions of the fuel efficiency curve. Thus, for example, in initial acceleration when the engine is being paced through the various transmission gears, there are rapid changes in engine speed, and hence rapid changes in engine efficiency readings. These transient conditions, which occur during vehicle acceleration, are of only brief duration.

It is also impossible to get a meaningful appraisal of operating efficiency when the engine is idling or when the vehicle is decelerating. In the idling operation, it is particularly inappropriate to display a reading of engine efficiency in terms of consumption per unit distance, since, with the vehicle stationary, any such reading would indicate infinite fuel consumption.

A fuel efficiency instrument which displays operating efficiency of the motor vehicle during all phases of vehicle operation might convey some useful information to the sophisticated vehicle operator, but would only confuse the average motor vehicle operator. Since every instrument reading in a motor vehicle should convey useful information to the vehicle operator, even a layman, without prior study of excess instruction material, such instruments should not display more data than can be used by the average vehicle operator. Such instruments for displaying vehicle operating efficiency should therefore convey enough useful information to the vehicle operator to improve his driving efficiency, but should not display information which would tend to confuse the operator and distract his attention from the road.

It is an object of the present invention to provide an instrument meter for displaying vehicle operating efficiency that is designed in accordance with the psychological and safety considerations such as not to irritate the driver of the vehicle with excess information, and yet provide him with information useful in achieving efficient vehicle operation.

SUMMARY OF THE INVENTION

In accordance with the invention, there is provided an improvement in an instrument for displaying an indication of the operating efficiency of a motor vehicle. The instrument includes a pointer, movable across an instrument face, and is improved such that there is provided an opaque screen over the face, the screen having a transparent window exposing a portion of the face corresponding to operating efficiencies of the vehicle while operating at constant vehicle speed.

In an instrument responsive to intake vacuum pressure of an internal combustion engine of the motor vehicle, the window in the opaque screen should correspond to a portion of the face corresponding to intake vacuum pressure between 0.2 and 0.6 $kg/cm^2$. Where the vehicle has a multiple gear transmission, the face may include a scale calibrated to the operating efficiency of the engine in its highest gear. In this case, a switch may be provided for disconnecting the meter from the intake manifold except when the engine is in the highest gear. In another embodiment of the invention, the meter may have a movement which is mechanically connected to an accelerator pedal of the vehicle.

Thus, according to the invention there is provided a screen which conceals the instrument pointer in all positions that it assumes during idling, acceleration, or deceleration operation of the vehicle. Accordingly, only those pointer positions are observable through the window which correspond to cruising of the vehicle, that is, the mode in which accelerations remain within comparatively narrow limits. It is in this mode that the vehicle is generally operated during extended periods of time, so that its operation during cruising, as just defined, determines the essential contribution to fuel consumption and hence to pollution and waste of energy.

During rapid acceleration of the vehicle, for example, in first starting from a standing position, the pointer of the instrument will move comparatively rapidly through the open range of the meter and will vanish behind the opaque screen without confronting the operator of the vehicle with a confusingly high reading of fuel consumption. The same applies to engine operation during idling or deceleration. As a rule, lowest fuel consumption is obtained during operation of the vehicle in its highest gear. Thus, the vehicle operator should use this gear wherever possible. When the pointer consistently appears within the open indicating range of the instrument according to the invention in some other gear, the transmission should be shifted to the next highest available gear.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

The drawing illustrates a preferred embodiment of the invention by way of example.

DESCRIPTION OF THE INVENTION

The drawing shows the intake pipe 1 of an internal combustion engine which includes a throttle 2 for controlling operation of the engine. Below the throttle 2 in the direction of flow, there is provided a line 4 which picks up the negative pressure of the intake passage at point 3, for use in a manometric indication of fuel consumption in the Bourdon tube 5 of instrument 6. Instrument 6 is provided with a graduated face 7 having a scale 8 calibrated in fuel consumption per 100 kilometers, or fuel consumption in miles per gallon. A pointer 11 is coupled to Bourdon tube 5 in the conventional way by means of gear 9 and pinion 10.

In front of the face 7 of meter 6 there is provided an opaque screen 13 having a transparent window 14 which extends over only that portion of the sweep of pointer 11 which corresponds to cruising operation of the vehicle. Oscillations of pointer 11 in idling or deceleration of the vehicle are made invisible by opaque portion 12 of the screen, and oscillations of pointer 11 during abrupt acceleration of the vehicle are made invisible by opaque portion 13 of the screen.

In the embodiment illustrated, there is provided fluid switch means 15 which is arranged between intake 1 and instrument 6 in passage 4, which connects the Bourdon tube 5 to the atmosphere when the piston 16 is in a neutral position; as shown, so that pointer 11 is outside window 14. When the transmission of the vehicle is placed selectively in its highest speed, spring 17, which is attached to the transmission shift lever at its left-hand end in the figure, draws valve 18 to the left thus connecting instrument 6 to the negative pressure of the intake 1. Thus, in accordance with this embodiment, the instrument 6 operates only when the vehicle is in its highest speed.

The arrangement shown in the drawing simplifies the instructions to be given to the vehicle operator for effecting fuel economy; he should try to keep the instrument pointer 11 within transparent window 14.

In accordance with the invention, the operator of the vehicle is provided only with fuel economy readings which occur during engine operating modes of some duration. Since these modes substantially determine the overall fuel economy of the vehicle, the limitation of the readings to the cruising range represent no loss of important information to the driver, but rather facilitates use of the fuel economy gauge as a guide to vehicle operation.

In an instrument of the type shown in the drawing, the limits of window 14 are advantageously located at pointer positions corresponding to intake pressures in the range of 0.2 to 0.6 kg/cm$^2$. Thus, the window will not embrace the entire range of uniform vehicle speeds. In addition to the scale 8 for the highest vehicle gear, the face 7 of the instrument may include other concentric scales calibrated in consumption readings for other gears. Such concentric scale arrangements are disclosed in the utility model referred to above. It is also possible to determine the efficiency in other gears of operation by means of a conversion factor.

It is also possible to use the meter of the present invention for display of an engine variable other than intake pressure. Thus, for example, in a diesel engine, it is possible to mechanically interconnect the pointer 11 to the intake throttle 2 by means of connecting cable or gears 19, to obtain an indication of the vehicle fuel consumption.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. In an instrument for displaying an indication of the operating efficiency of a motor vehicle having a multiple speed transmission, said instrument including a pointer movable across an instrument face, the improvement wherein there is provided an opaque screen over said face, said screen being fixed relative to said instrument face and having a transparent window exposing a portion of said face corresponding to operating efficiencies of said vehicle while operating at constant speed, and wherein said face includes a scale calibrated to indicate operating efficiency when said transmission is in its highest speed, and wherein there is provided means for moving said pointer across said instrument face in response to engine intake vacuum pressure, and wherein there is provided fluid switch means between the pointer moving means and the intake passage of the vehicle engine, for selectively establishing a connection to said means for moving said pointer only when said transmission is in its highest speed.

* * * * *